Figure 1:
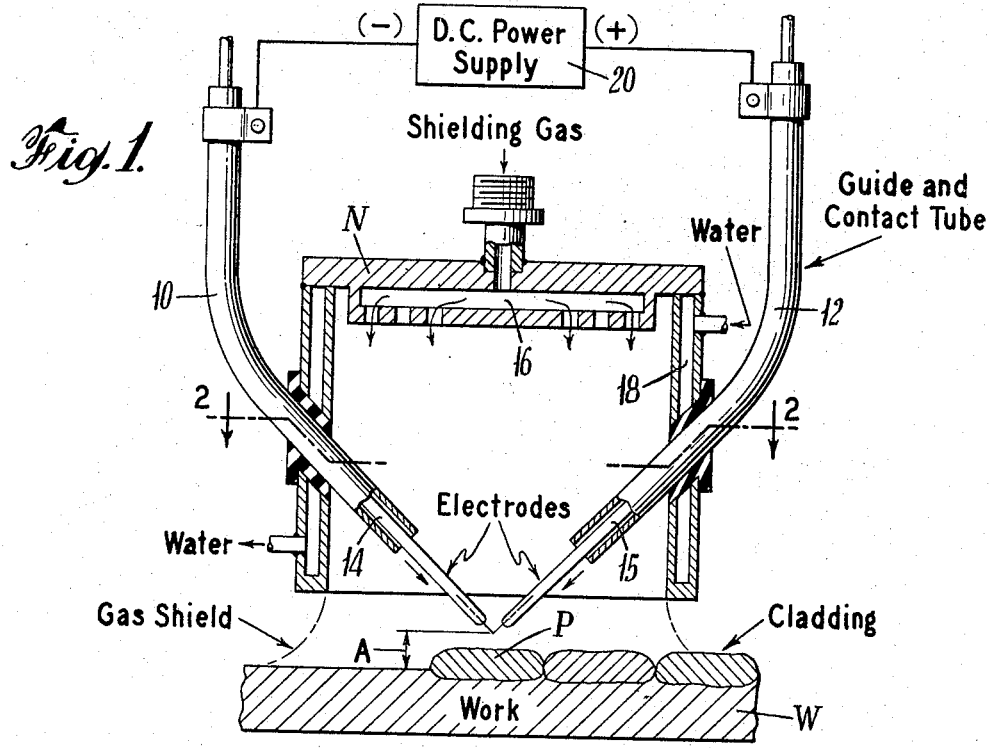

March 3, 1959 — G. REINHARDT — 2,876,330
INERT GAS SHIELDED METAL ARC CLADDING PROCESS
Filed Feb. 18, 1957

INVENTOR
GUSTAV REINHARDT
BY Richard S. Shreve
ATTORNEY

United States Patent Office 2,876,330
Patented Mar. 3, 1959

2,876,330

INERT GAS SHIELDED METAL ARC CLADDING PROCESS

Gustav Reinhardt, Grand Island, N. Y., assignor to Union Carbide Corporation, a corporation of New York Application February 18, 1957, Serial No. 640,700

4 Claims. (Cl. 219—76)

This invention relates to inert gas shielded metal arc cladding processes, and more particularly to processes of this character for depositing a layer of surfacing metal onto a body of base metal.

For depositing copper rotating bands on steel ammunition shells, the present practice necessitates that the shell and preformed band first be machined, and the copper ring then sweated into position on the shell. It is desirable to eliminate this machining and to provide a stronger union between the two metals. A need for an improved process for cladding steel with copper has existed for many years, particularly with low dilution to be useful for copper overlays on brake shoes for improved cooling.

It is, therefore, the main object of the present invention to avoid the difficulties referred to above, and to fulfill the need for an improved process for cladding steel with copper whereby the electrical and physical properties of steel surfaces may be materially enhanced.

The surfacing technique comprising the invention relates specifically to sigma welding, wherein multiple consumable electrodes are employed to deposit the layers of copper on steel surfaces under an inert gas shield. It has been determined that two electrodes in series arrangement, where one electrode is connected to the positive and the other to the negative terminal of a current source, succeed in producing wide smooth beads of acceptable quality. Furthermore, the resultant beads evidence only a moderate amount of dilution in the base plate.

Figure 2:
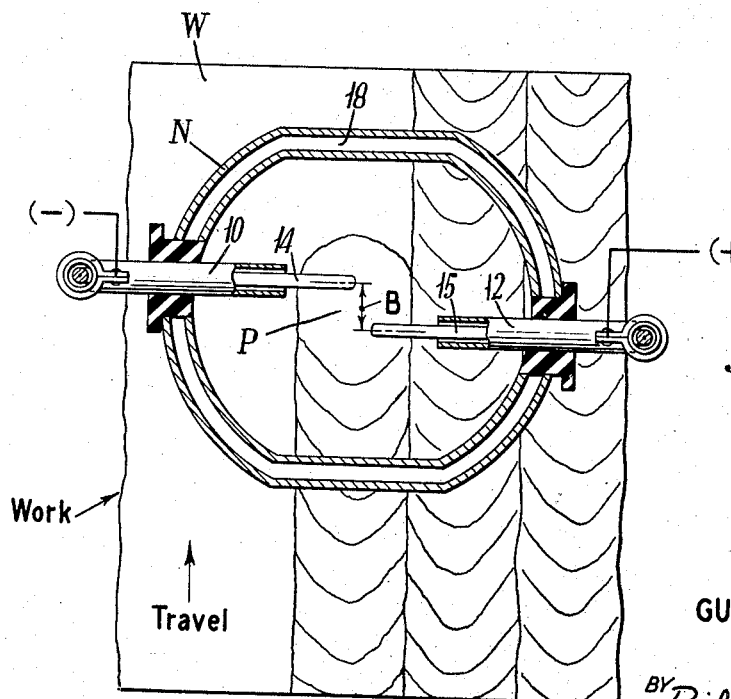

In the drawings:

Fig. 1 is a vertical section through apparatus for carrying out the method according to the preferred embodiment of the present invention; and Fig. 2 is a horizontal section taken along the line 2—2 of Fig. 1.

The apparatus shown in the drawing comprises a torch nozzle or cup N, into which project downwardly and inwardly inclined guide and contact tubes 10 and 12 for supplying consumable wire electrodes 14 and 15 of cladding metal, preferably copper. The nozzle N has in the top thereof a chamber 16 for supplying shielding gas such as argon, and an annular cooling jacket 18 for cooling fluid such as water.

The guide tube 12 is connected to the positive terminal of a source 20 of direct current, the negative terminal of which is connected to the guide tube 10. It is preferred that the wire electrodes are fed along lines which intersect at an angle. The electrode tips are preferably spaced apart in series arrangement so that each electrode is consumed in its own arc. The arcs are preferably maintained at a distance A above the surface of the workpiece W to deposit metal from the electrodes thereon to form a cladding puddle P.

The straight polarity electrode 14 should be slightly in front of the reverse polarity electrode 15 for a distance B shown in Fig. 2. This arrangement proves extremely beneficial since some spatter accompanies the consumption of the straight polarity electrode, and by keeping it in front of the reverse polarity electrode, the influence of the magnetic flux which would characterize a mutual arc is minimized and the results of the spatter limited to the area on the straight polarity side of the bead. The elimination of spatter resulting from the straight polarity electrode cannot be completely avoided but this condition is substantially alleviated by the second pass, at which time all of the spatter resulting from the straight polarity electrode is melted by the arc of the reverse polarity electrode, which on subsequent passes is adjacent to the previous bead.

*Typical example*

Actual sigma welds were made employing dual electrodes in series arrangement to deposit copper beads on ½-inch thick mild steel plates. A ³⁄₃₂-inch copper electrode (No. 63) was the leading, straight polarity electrode, while a ⅛-inch copper reverse polarity electrode (No. 19) trailed. Three welds, Nos. S-224, S-225, and S-226, produced surface layers at 370 amperes at a speed of about 10 inches per minute, with the angle of intersection between the two electrodes being at 85 degrees. The point at which the two electrodes intersected was approximately ½ inch above the base plate. Argon was employed as the gas shield and was admitted to the arc area at the rate of 120 cubic feet per hour. The percent dilution, and height and width of the deposited beads, all of good contour and acceptable appearance, are as follows:

| Weld No. | Percent Dilution | Height in Inches | Width in Inches |
|---|---|---|---|
| S-224 | 13 | ⅛ | 1½ |
| S-225 | 13 | ³⁄₃₂ | 1¾ |
| S-226 | 8 | ⅛ | 1½ |

*Electrode compositions*

| | No. 63 | No. 19 |
|---|---|---|
| | Percent | Percent |
| Tin | 0.65–0.90 | 2.50–2.90. |
| Phosphorus | | 0.05–0.15. |
| Silicon | 0.15–0.35 | 0.005 max. |
| Lead | 0.05 max | 0.30 max. |
| Zinc | | 0.05 max. |
| Iron | | 0.005 max. |
| Manganese | 0.10–0.25 | |
| Copper | Balance | Balance. |

What is claimed is:

1. Inert gas shielded metal arc cladding process for depositing a layer of copper surfacing onto the surface of a workpiece of steel, which comprises striking an arc between a trailing positive copper wire electrode and a leading negative copper wire electrode in series arrangement spaced apart to consume the trailing positive copper electrode in a reverse polarity arc and to consume the leading negative electrode in a straight polarity arc, passing a stream of shielding gas over the copper electrodes to shield their arcs, maintaining said arcs a predetermined distance from a steel work surface to deposit thereon copper consumed from said wire electrodes to form a copper cladding puddle, and advancing said leading negative copper wire electrode, said trailing positive copper wire electrode, said stream of shielding gas and said copper cladding puddle along a line of cladding on said steel work surface to apply a layer of copper cladding onto said steel work surface.

2. Gas shielded metal arc cladding process for depositing a layer of metal surfacing onto the surface of a workpiece of metal, which comprises striking an arc between a trailing positive wire electrode of larger diameter and a leading negative wire electrode of smaller diameter in series circuit relation with each other and such workpiece, said electrodes being spaced apart to consume the positive larger diameter electrode in a reverse polarity arc and to consume the negative smaller diameter electrode in a straight polarity arc, passing a stream of shielding gas over the electrodes to shield their arcs, maintaining said arcs a predetermined distance from the work surface to deposit thereon metal consumed from said wire electrodes to form a cladding puddle, and advancing said wire electrodes, arcs, stream of shielding gas and cladding puddle along a line of cladding on said work surface to apply a layer of cladding onto said work surface.

3. Cladding steel with copper and alloys thereof by the consumable electrode series arc technique as defined by claim 2, which comprises striking series arcs between the spaced ends of selected copper alloy wire electrodes that are connected to a direct current source of electricity, and the work surface, respectively, while shielding the arcs and adjacent metal with argon gas.

4. Cladding as defined by claim 3, in which the angle of intersection between the two electrodes is about 85°, and the point at which such electrodes intersect is approximately ½-inch above the work surface.

References Cited in the file of this patent

UNITED STATES PATENTS

| | | |
|---|---|---|
| 1,133,508 | Schoop | Mar. 30, 1915 |
| 1,946,302 | Weller | Feb. 6, 1934 |
| 2,669,640 | Outcalt et al. | Feb. 16, 1954 |
| 2,681,970 | Koopman | June 22, 1954 |
| 2,813,190 | Felmley | Nov. 12, 1957 |

OTHER REFERENCES

"Welding Engineer" (Wyer), July 1949, pages 26–27.
"Welding Journal" (Pilia), January 1956, page 41.